Jan. 26, 1954

E. G. MARTIN

CAVITY TUNER 2,667,623

Filed Jan. 8, 1946

2 Sheets-Sheet 1

INVENTOR
EDWARD G. MARTIN

BY

ATTORNEY

Jan. 26, 1954 E. G. MARTIN 2,667,623

CAVITY TUNER

Filed Jan. 8, 1946 2 Sheets-Sheet 2

INVENTOR
EDWARD G. MARTIN

BY M. C. Hayes

ATTORNEY

Patented Jan. 26, 1954

2,667,623

UNITED STATES PATENT OFFICE 2,667,623

CAVITY TUNER

Edward G. Martin, Cambridge, Mass.

Application January 8, 1946, Serial No. 639,888

11 Claims. (Cl. 333—82)

This invention relates broadly to tuning mechanisms for cavity resonators, magnetron oscillators and the like, and more particularly to a cavity tuning mechanism which will provide manual tuning of a cavity and, in addition, automatic tuning to compensate for frequency variations caused by a variation in cavity temperature.

There is disclosed in my copending application Serial No. 537,280, filed May 25, 1944, now Patent No. 2,501,728, a resonant cavity tuning mechanism by means of which the physical dimensions of a cavity may be adjusted to a value which will cause the cavity to be resonate to a desired frequency.

A limitation of the above and other manual tuning mechanisms of a similar type is that, after the cavity has been tuned to a desired frequency, a variation in cavity temperature thereafter will change the physical dimensions of the cavity and hence its resonant frequency, thus necessitating further manual tuning of the cavity in order to return it to its original frequency.

An object of this invention is to provide a compact and rugged manually operated tuning mechanism for imparting linear motion to a tuning plunger, which is disposed in the head of a magnetron oscillator or other resonant cavity, in such a manner as to permit manual tuning of the cavity to a desired frequency.

Another object of this invention is to provide a resonant cavity tuning mechanism in compliance with the object specified above and which will additionally provide, without manual attention, automatic tuning adjustments in order to compensate for frequency changes caused by variations in cavity temperature.

The above and other objects of the invention will be apparent to those skilled in the art from a consideration of the detailed description which follows taken together with the accompanying drawings, in which.

Referring now to the accompanying drawings, there is disclosed a section of a resonant cavity 11 which may be manually tuned by means of a manual tuning knob 71 which is mechanically coupled to tuning plunger 68 in such a manner as to impart linear motion thereto. A bimetallic spirally wound element 43, composed of two metals having dissimilar temperature expansion coefficients, is additionally coupled to plunger 68 in such a manner that variation in cavity temperature will cause cavity 11 to be automatically retuned to compensate for a frequency change thereof caused by the above variation in temperature.

Figures 1, 2:
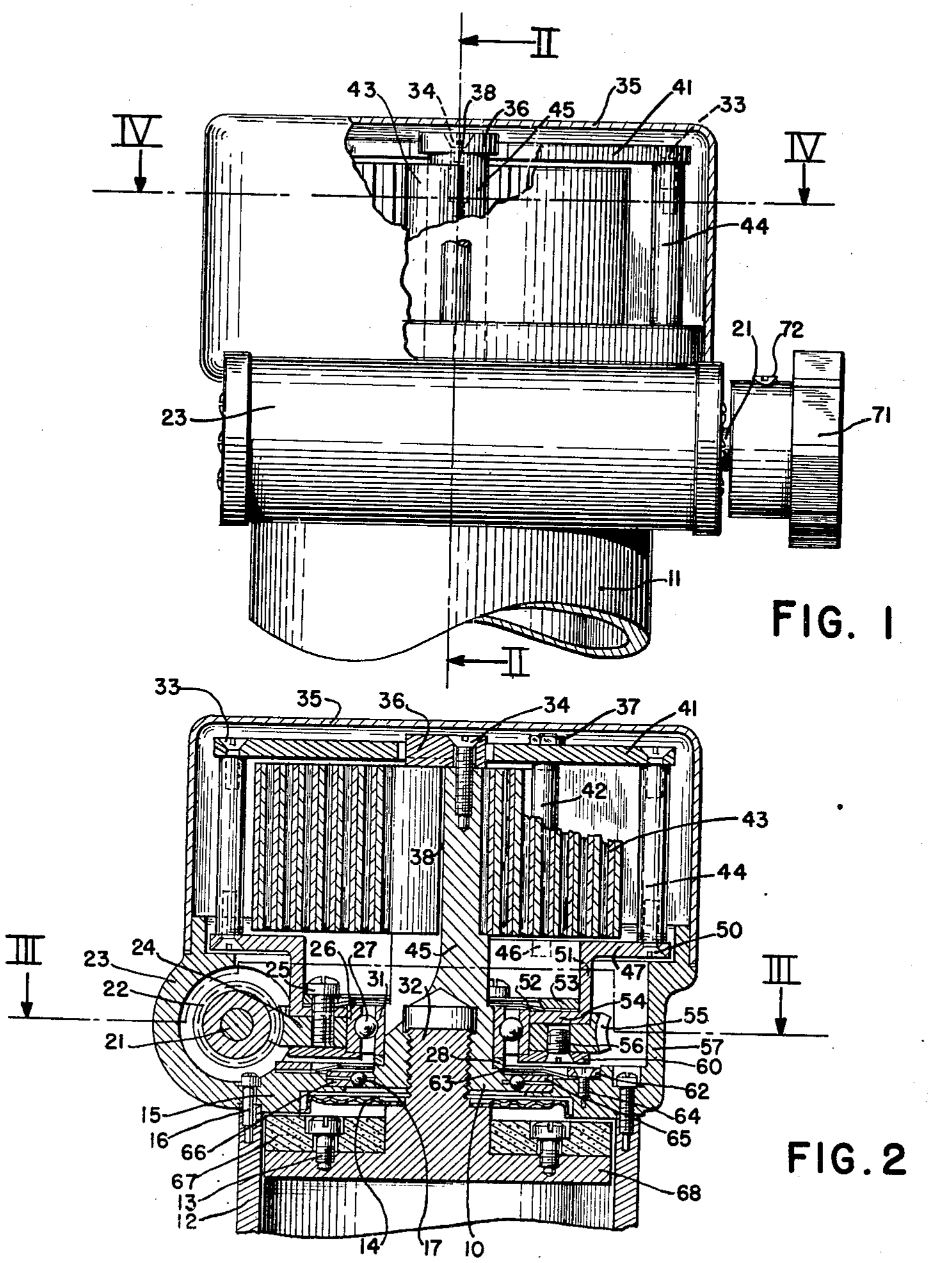
Fig. 1 shows a partially broken away side view of one embodiment of the invention in combination with a section of a resonant cavity.
Fig. 2 shows a partial cross section view of the embodiment taken along plane II—II of Fig. 1.

With specific reference to the drawings and more particularly to Fig. 2, there is shown a circular tuning plunger 68, of conducting material, transversely positioned in one end of cavity 11 and adapted for linear movement axially therein. A lead screw 32 is formed on the upper surface of plunger 68 and extends coaxially upwards therefrom. A substantially ring shaped housing 57 is secured to the above mentioned end of cavity 11 by means of machine screws 16 recessed in and passing through an inwardly extending flange 15, formed on the lower end of housing 57, into cavity wall 12. The above mentioned end of cavity 11 is closed and plunger 68 sealed therein by a circular flexible diaphragm 14, of conducting material and of substantially washer like shape, mechanically and electrically secured, as by silver soldering, at its outer circumference to flange 15 and at its inner circumference to the base of lead screw 32. A nut 10 is positioned coaxially about lead screw 32 and is rotatably supported in relation to cavity wall 12 by a first ball bearing 17. The inner race of ball bearing 17 is cut circumferentially in nut 10 and the outer race, which is composed of an upper 65 and a lower 66 section, is supported by a circular shoulder formed, as shown, on the inwardly extending end of flange 15. A circular Phosphor bronze spring 63, which is secured to flange 15 by machine screws 64 and washer 62, is adapted to exert a force on upper section 65 of ball bearing 17 in such a manner as to hold the balls of ball bearing 17 in snug relationship to both races. Lead screw 32 is adapted to engage the threads of nut 10 in such a manner that rotary motion of nut 10 will impart linear motion to lead screw 32. A circular worm gear 24, formed with a circular center opening of suitable size, is concentrically and rotatably supported about nut 10 by means of a second ball bearing 27. The circular inner race 31 of ball bearing 27 fits snugly about and is supported in relation to nut 10 by a spacing ring 28 adapted to fit about nut 10 and supported by a shoulder formed thereon as shown. Circular outer race 26 of ball bearing 27 is supported within the above-described center opening of worm gear 24 and in snug relationship thereto by means of a bearing shoulder 60, of washer-like shape, secured to the lower surface of worm gear 24 by means of machine screws 56. A second circular Phosphor bronze spring 52, which is secured in fixed relationship to worm gear 24 by means of machine screws 25 and ring clamp 53, is adapted to exert a force against outer race 26 in such a manner as to hold the balls of ball bearing 27 in snug relationship to both races. Rotary motion is imparted to worm gear 24 by a suitable manually adjusted drive gear.

Figure 3:
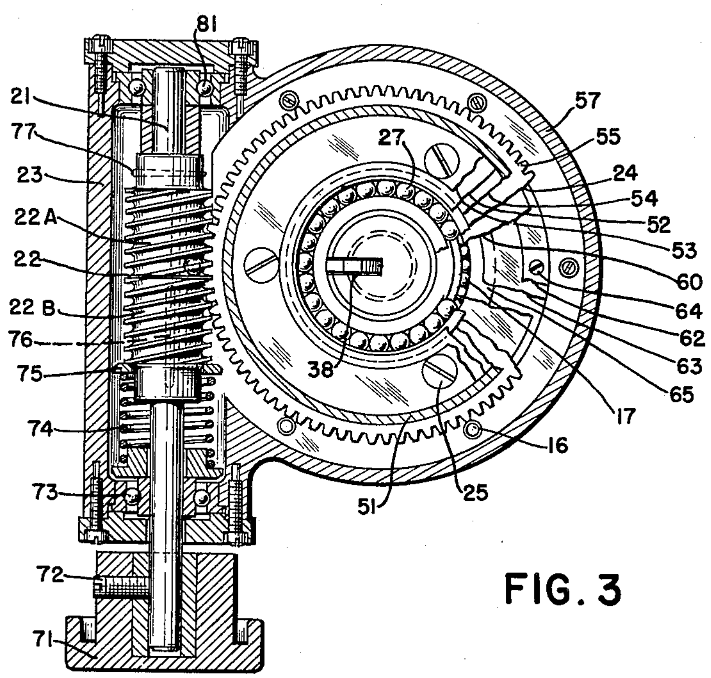
Fig. 3 shows a partially cut away view of the embodiment of Fig. 1 taken along line III—III of Fig. 2.

The above-mentioned drive gear may be constructed as shown in Fig. 3, consisting of a worm 22, adapted to mesh with teeth 55 of worm gear 24. In order to reduce "backlash" in the driving mechanism, worm 22 is split transversely into two sections 22*a* and 22*b*, section 22*a* being secured to drive shaft 21 by means of taper pin 77 and section 22*b* being slidably secured to shaft 21 by means of key 76. A helically wound spring 74, disposed about shaft 21, thrusts against spring thrust washer 75, abutted to the outwardly extending end of section 22*b*, thereby holding the thread of worm 22 and teeth 55 of worm gear 24 in snug mesh. Drive rod 21 is rotatably supported within a cylindrical drive gear housing 23, formed on and supported by housing 57, by means of ball bearings 73 and 81. One end of drive rod 21 extends through housing 23 and manual tuning knob 71 is secured thereto by means of set screw 72.

Figure 4:
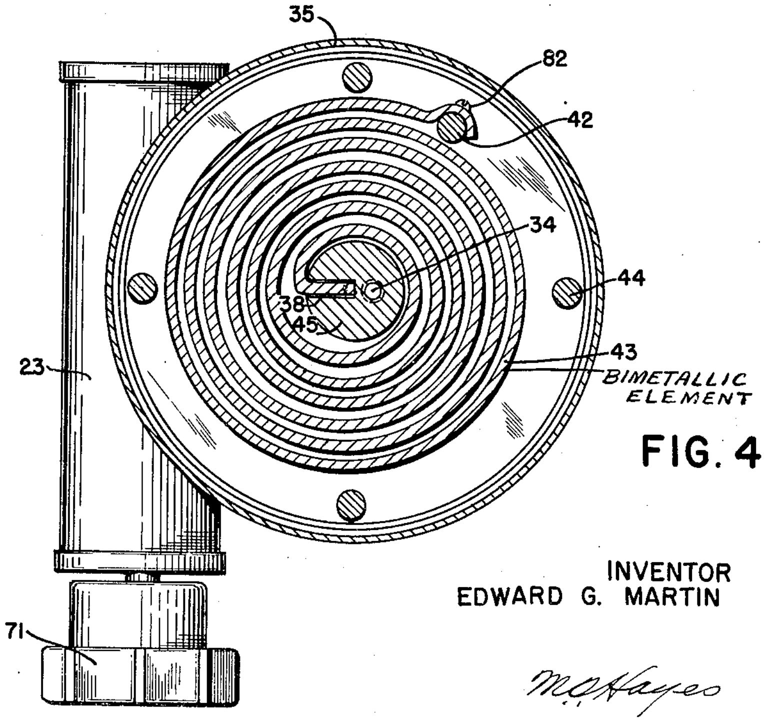
Fig. 4 shows a cross section view of the embodiment taken along plane IV—IV of Fig. 1.

With particular reference again to Fig. 2, a cylindrical shaft 45 is formed on the upper surface of nut 10 and extends coaxially upwards therefrom. A circular plate 41 is supported concentrically about, but is not secured to, the outwardly extending end of shaft 45 by means of cylindrical spacers 44 positioned circumferentially about plate 41 and secured thereto at their upper ends by machine screws 33. The lower ends of spacers 44 are supported by an outwardly extending flange 47, formed on the upper end of a supporting ring 51, being secured to flange 47 by machine screws 50. Supporting ring 51 is secured to and supported by worm gear 24 by means of machine screws 25 passing through an inwardly extending flange 54, formed on the lower end of ring 51, into worm gear 24. A bimetallic element 43 (see also Fig. 4) is spirally disposed about shaft 45 and positioned within the partially enclosed cylindrical shaped structure formed by plate 41, spacers 44, and flange 47 of ring 51. Element 43 is composed of two metals, bonded together throughout their entire length, having dissimilar temperature expansion coefficients. The inner end of element 43 is secured within a longitudinal slot 38 cut in shaft 45 by means of locking cap 36 secured to the outer end of shaft 45 by machine screw 34. The outer end of element 43 is secured to anchor pin 42, which is secured at its lower end to flange 47 by rivet 46 and at its upper end to plate 41 by nut 37, by means of machine screws 82 (Fig. 4). Element 43 and the associated structures are enclosed by a removable cover 35 of inverted cup shape which fits into a suitable shoulder formed on the upper end of housing 57.

The operation of the embodiment is as follows:

Rotary motion of manual tuning knob 71 is coupled by means of worm 22 to worm gear 24 and by means of element 43 from worm gear 24 to shaft 45 and nut 10 formed thereon. During this operation element 43 acts to directly couple worm gear 24 to nut 10 so that worm gear 44 and nut 10 rotate together. As previously described, rotary motion of nut 10 imparts linear motion to lead screw 32 and to tuning plunger 68 formed thereon, thus changing the physical dimensions and volume of cavity 11 and hence its resonant frequency. A circular electromagnetic energy absorption block 67, of suitable material known to the art, is secured to the upper face of plunger 68 by means of machine screws 13 in order to minimize the characteristics tending to cause oscillations in the space between plunger 68 and flexible diaphragm 14.

After cavity 11 has been manually tuned to a desired frequency, as described above, element 43 will act to maintain the tuning at this frequency even though the temperature of the cavity changes. This action of element 43 may be explained as follows. Since element 43 has a finite thickness there is a small difference in the length of element 43 measured along the outside of the spiral and the length of element 43 measured along the inside of the spiral. In other words, the inner strip of element 43 is slightly shorter than the outer strip of element 43. The ratio of this difference in length to the total length of the spiral will depend on how tightly the spiral is curled. The strips composing element 43 have dissimilar temperature coefficients so that changes in temperature will change the difference in the lengths of the two strips. This difference in length will change more rapidly than the total length so that the ratio of the difference to the total length will change. This change in ratio will cause a corresponding change in curvature of the spiral. For example, if the inner strip has the greater coefficient of expansion, the radius of curvature will tend to increase with increase in temperature. The change in total length of element 43 due to temperature will not be sufficient to compensate for the increase in circumference of each turn of the spiral as the radius of curvature of the spiral increases. It follows, therefore, that the number of turns in the spiral must decrease. This decrease in number of turns can be accomplished only if there is relative rotation between shaft 45 and worm gear 24 since the two ends of the spiral are clamped to these elements. Worm gear 24 is held fixed by worm 22 so the change in temperature of element 43 results in rotation of shaft 45. This rotation of shaft 45 imparts linear motion to tuning plunger 68 to alter the tuning of the cavity 11 in a direction to compensate for variations in temperature of cavity 11. It will be obvious from the foregoing discussion that the length of the spiral and the coefficients of expansion of the two strips making up element 43 may be so chosen that the movement of plunger 68 due to temperature variations of element 43 compensates exactly for changes in frequency of cavity 11 due to corresponding temperature changes in cavity 11.

It is recognized that, to those skilled in the art, there will be apparent various modifications and arrangements which may be made without departing from the spirit and scope of the principles entailed.

The invention is only to be limited by the appended claims:

What is claimed is:

1. A temperature compensating tuning mechanism for cavity resonators and the like comprising, a movable tuning element including a flexible diaphragm disposed in one end of said cavity and secured at its outer edges thereto, a nut rotatably secured to said cavity by a ball bearing, a lead screw secured to said tuning element and adapted to engage the threads of said nut, a manually operated tuning control, and a bimetallic element composed of metals having dissimilar temperature expansion coefficients, said bimetallic element being secured at one end to said nut and at the other end to said control in such a manner as to mechanically couple said control to said nut, whereby said cavity may be tuned to a desired frequency by means of said manually operated tuning control and will thereafter be automatically retuned by means of said bimetallic element in such a manner as to compensate for a change in frequency caused by a change in the dimensions of said cavity due to a variation in cavity temperature.

2. A temperature compensating tuning mechanism for cavity resonators and the like comprising, a movable tuning element including a flexible diaphragm, disposed in one end of a resonant cavity and secured at its outer edges thereto, a nut positioned outwardly from said one end of said cavity and concentric about the axis thereof, said nut being rotatably secured to said cavity by means of a first ball bearing, a lead screw secured to said diaphragm at a central point thereof and adapted to engage the threads of said nut in such a manner that rotary motion of said nut will impart linear motion to said screw and thereby flexing said diaphragm, a circular worm gear rotatably secured to said nut by means of a second ball bearing, a manually adjusted drive gear arranged to mesh with said worm gear in such a manner as to impart rotary motion thereto, means for locking said drive gear in a desired position, a cylindrical shaft formed on the outwardly extending end of said nut and extending coaxially outward therefrom, a bimetallic element spirally disposed about said shaft, said bimetallic element being composed of two metals having dissimilar temperature expansion coefficients, and means for securing said bimetallic element at its inner end to said shaft and at its outer end to said worm gear in such a manner as to couple thereby rotary motion of said worm gear to said shaft, whereby said cavity may be tuned to a desired frequency by means of said manually adjusted drive gear and will thereafter be automatically returned by means of said bimetallic element in such a manner as to compensate for a change in frequency caused by a change in the dimensions of said cavity due to a variation in cavity temperature.

3. A temperature compensating tuning mechanism for cavity resonators and the like comprising, a circular tuning plunger of conducting material transversely positioned in one end of said cavity and adapted to permit axial movement therein, a flexible diaphragm of conducting material transversely disposed across said one end of said cavity and sealed at its outer edges thereto, said diaphragm being positioned outermost from said plunger, a first ball bearing, a circular nut positioned outwardly from said diaphragm and concentric about the axis thereof, being rotatably supported in relation to said cavity by means of said first ball bearing, means for supporting said first ball bearing in fixed relationship to said cavity, a second ball bearing, a circular worm gear positioned concentrically about said nut and rotatably supported in relation thereto by said second ball bearing, means for supporting said second ball bearing in relation to said nut and said worm gear, a lead screw formed on said plunger at a central point thereof and extending coaxially outward therefrom extending through the center of said diaphragm, said diaphragm being sealed thereto, said lead screw being adapted to engage the threads of said nut in such a manner that rotary motion of said nut will impart linear motion axially to said lead screw and plunger joined thereto, a circular electromagnetic energy absorption block of similar diameter as said plunger concentrically disposed about said lead screw and positioned between said diaphragm and said plunger, means for securing said absorption block to said plunger, a manually adjusted worm arranged to mesh with said worm gear in such a manner as to impart rotary motion thereto, a cylindrical shaft formed on the outer end of said nut and extending coaxially outwards therefrom, a bimetallic element spirally disposed about said shaft, said bimetallic element being composed of two metals having dissimilar temperature expansion coefficients, means for securing said bimetallic element at its inner end to said shaft and at its outer end in fixed relationship to said worm gear, and means for enclosing and supporting said bimetallic element and shaft in a suitable housing, whereby said cavity may be manually tuned as desired and in addition will be automatically tuned to compensate for frequency changes caused by changes in cavity dimensions due to temperature variations.

4. A temperature compensating tuning mechanism for a cavity resonator comprising a tuning element, a lead screw secured to said tuning element, means adapted to nonrotatively support said tuning element within said resonator, said supporting means permitting movement of said tuning element relative to said resonator in a direction parallel to the axis of said lead screw, a nut threadably engaging said lead screw, means associated with said resonator for supporting said nut, said last-mentioned supporting means permitting rotation of said nut relative to said resonator and about said axis and precluding motion of said nut relative to said resonator in a direction parallel to said axis, and a temperature sensitive element coupled at one end to said nut and having its second end fixed with respect to said tuning element, said temperature sensitive element being adapted to cause said nut to rotate relative to said lead screw as the temperature of said temperature sensitive element varies whereby changes in temperature of said temperature sensitive element result in corresponding changes in position of said tuning element within said resonator.

5. A temperature compensating tuning mechanism for a cavity resonator comprising a tuning element, a lead screw secured to said tuning element, means adapted to nonrotatively support said tuning element within said resonator, said supporting means permitting movement of said tuning element relative to said resonator in a direction parallel to the axis of said lead screw, a nut threadably engaging said lead screw, means associated with said resonator for supporting said nut, said last-mentioned supporting means permitting rotation of said nut relative to said resonator and about said axis and precluding motion of said nut relative to said resonator in a direction parallel to said axis, and a bimetallic spiral coupled at one end to said nut, means for maintaining the second end of said spiral stationary with respect to said tuning element, said bimetallic spiral being adapted to cause said nut to rotate relative to said lead screw as the temperature of said spiral is changed whereby changes in temperature of said bimetallic spiral result in corresponding changes in position of said tuning element within said resonator.

6. A temperature compensating tuning mechanism for a cavity resonator comprising a tuning element, a lead screw secured to said tuning element, means adapted to support said tuning element within said resonator, said supporting means permitting movement of said tuning element relative to said resonator in a direction parallel to the axis of said lead screw, said supporting means precluding rotation of said lead screw relative to said resonator a nut threadably engaging said lead screw, means associated with said resonator for supporting said nut, said last-mentioned supporting means permitting rotation of said nut relative to said resonator and precluding motion of said nut relative to said resonator in a direction parallel to said axis of said lead screw, an adjusting member mounted for rotation about said axis of said lead screw, a bimetallic spiral coupled at one end to said nut and at a second end to said adjusting member, said bimetallic spiral being adapted to limit relative rotative movement of said nut with respect to said adjusting member, said bimetallic spiral being adapted to cause a predetermined rotation of said nut with respect to said adjusting member for a given change in temperature of said spiral, and means coupling said adjusting member to said resonator, said last-mentioned means being adapted to control the rotative positions of said adjusting member about said axis.

7. A temperature compensated tuning mechanism for a cavity resonator comprising a tuning element, a lead screw secured to said tuning element, means adapted to support said tuning element within said resonator, said supporting means permitting movement of said tuning element relative to said resonator in a direction parallel to the axis of said lead screw, said supporting means precluding rotation of said lead screw relative to said resonator, a nut threadably engaging said lead screw, means associated with said resonator for supporting said nut, said last-mentioned supporting means permitting rotation of said nut relative to said resonator and precluding motion of said nut relative to said resonator in a direction parallel to said axis of said lead screw, a disc mounted on said nut for rotation relative to said nut and about said axis of said lead screw, a bimetallic spiral coupled at one end to said nut and at a second end to said disc, the axis of said spiral being coincident with the axis of said lead screw, said bimetallic spiral being adapted to limit relative rotative motion of said nut with respect to said disc, said bimetallic spiral being adapted to cause a predetermined rotation of said nut with respect to said disc for a given change in temperature of said spiral, and manually operable adjusting means coupling said disc to said resonator.

8. A temperature compensated tuning mechanism for a cavity resonator as in claim 7 wherein the outer periphery of said disc is formed in the shape of a worm gear and wherein said manually operable adjusting means comprises a worm journaled in bearings secured to said resonator, said worm engaging said worm gear to provide for rotation of said disc.

9. A temperature compensating tuning mechanism for a cavity resonator comprising a tuning element, a lead screw-nut combination for moving said tuning element within said resonator, said lead screw and said nut being threadably engaged, means for securing a first element of said combination to said tuning element, means secured at one end to said resonator restricting rotation of said element secured to said tuning element while permitting movement of said tuning element relative to said resonator in a direction parallel to the axis of said lead screw, means associated with said resonator for supporting the second element of said lead screw-nut combination, said last-mentioned supporting means permitting rotation of said second element of said combination relative to said resonator and about said axis and precluding motion of said second element relative to said resonator in a direction parallel to said axis, and a temperature sensitive element coupled at one end to said second element and having its second end relatively fixed with respect to said tuning element, said temperature sensitive element being adapted to cause said second element to rotate relative to said first element of said combination as the temperature of said temperature sensitive element varies whereby changes in temperature of said temperature sensitive element result in corresponding changes in position of said tuning element within said resonator.

10. A temperature compensating tuning mechanism for a cavity resonator as in claim 9 wherein said temperature sensitive element comprises a bimetallic spiral.

11. A temperature compensating tuning mechanism for a cavity resonator comprising a tuning element, a flexible diaphragm joining said tuning element to said resonator, a lead screw secured to said tuning element, the axis of said lead screw being substantially perpendicular to the plane of said diaphragm, a nut threadably engaging said lead screw, means associated with said resonator for supporting said nut, said supporting means permitting rotation of said nut relative to said resonator and about said axis and precluding motion of said nut relative to said resonator in a direction parallel to said axis, and a bimetallic spiral coupled at one end to said nut, means for maintaining the other end of said spiral stationary with respect to said tuning element, said bimetallic spiral being adapted to cause said nut to rotate relative to said lead screw as the temperature of said spiral is changed whereby changes in temperature of said bimetallic spiral result in corresponding changes in position of said tuning element within said resonator.

EDWARD G. MARTIN.

References Cited in the file of this patent

UNITED STATES PATENTS

| Number | Name | Date |
|---|---|---|
| 2,225,210 | Dillon | Dec. 17, 1940 |
| 2,234,570 | Markley | Mar. 11, 1941 |
| 2,236,004 | MacLean | Mar. 25, 1941 |
| 2,302,256 | Rietzel | Nov. 17, 1942 |
| 2,374,810 | Fremlin | May 1, 1945 |
| 2,409,321 | Stephan | Oct. 15, 1946 |
| 2,439,809 | Hunter | Apr. 20, 1948 |
| 2,521,719 | Hildebrand | Sept. 12, 1950 |